United States Patent Office 3,592,867
Patented July 13, 1971

3,592,867
ETHYLENE-PRODUCING PROCESS
Ernest L. Pollitzer, Skokie, Ill., assignor to Universal Oil Products Company, Des Plaines, Ill.
No Drawing. Filed Sept. 8, 1969, Ser. No. 856,161
Int. Cl. C07c 3/00, 11/24
U.S. Cl. 260—683
9 Claims

ABSTRACT OF THE DISCLOSURE

Propane is subjected to dehydrogenation in contact with a non-acidic, Group VIII noble metal catalyst to produce propylene. The propylene is subjected to hydrocracking, in contact with a Group VIII metal component hydrocracking catalyst to produce ethylene. The process produces ethylene in essentially 100.0% molal yields, based upon propane feed.

APPLICABILITY OF INVENTION

The inventive concept herein described involves the production of ethylene from propane, or a mixture of propane and propylene. More specifically, the present invention encompasses a combination process involving dehydrogenation and hydrocracking for the production of ethylene, the by-product of which combination process is essentially methane.

Ethylene, as a result of its great degree of reactivity, is extensively employed in a variety of commercial industries including the petroleum, petrochemical, pharmaceutical, plastics, heavy chemicals, etc. Widespread use of ethylene as a raw material in the manufacture of numerous synthetic, petroleum-derived chemical products, fuel, etc., is practiced. For example, ethylene is used as a source of great quantities of ethyl and ethylene compounds, including ethylene oxide, ethyl alcohol, ethylene dichloride and polyethylene, etc. Ethylene is employed to a large extent in the alkylation of aromatic hydrocarbons, such as benzene, to yield alkylaromatics, such as ethylbenzene. It is well known that a principal use of ethylbenzene resides in the dehydrogenation thereof to produce styrene. Other uses of ethylene include the coloring of fruit, the blanching of vegetables, increasing the growth rate of various seedlings, for oxyethylene welding and the cutting of metals. Within the petroleum industry, there has, therefore, been created a need not only for large quantities of ethylene, but also for methods and means for the more efficient, economical production thereof.

The most common prior art method for the production of ethylene involves pyrolysis, or thermal cracking, of saturated light hydrocarbons, including ethane and/or propane, light naphthas boiling up to about 170° F., and in many instances, higher boiling hydrocarbon mixtures. In many prior art thermal cracking processes, steam is admixed with the hydrocarbon charge, and such processes are often referred to as "steam-cracking." As a result of the thermal cracking conditions, the normally gaseous, thermally-cracked product effluent consists principally of ethylene, propylene, acetylene, butadiene, unreacted hydrocarbonaceous charge stock, etc. There is involved in such prior art processes, intricate, tedious recovery schemes required to obtain the ethylene in a substantially pure state.

Regardless of the use for which the ethylene-rich cracked product effluent is intended, it is necessary that the ethylene be concentrated through the recovery thereof from the total cracked product effluent. In particular, the removal of acetylene and butadiene from the ethylene-rich stream, prior to the use thereof, is not only desired but essential in many instances. For instance, in a process for the alkylation of benzene, to produce ethylbenzene, strict limitations have been placed upon the acetylene and butadiene content of the ethylene-rich feed gas. The presence of "contaminants," as a result of undesirable side reactions, fosters the formation of diphenyl butanes and diphenyl ethanes, which products create an environment, within the alkylation reaction zone, conducive to catalyst poisoning. Furthermore, acetylene and butadiene, as well as other olefins having more than a single double-bond, have a strong tendency to undergo polymerization reactions, thereby forming heavy hydrocarbonaceous material which becomes deposited on and within the catalytic composite.

A pyrolysis ethylene-rich effluent also contains tarry material and certain liquid by-products which are unstable and present treating and disposal problems. With respect to prior art thermal cracking processes, the recovery of an ethylene-rich gaseous phase, substantially free from acetylene, butadiene and other olefins having more than one double-bond, involves an expensive series of processing techniques including quenching, cooling, refrigeration, compressing, selective hydrogenation, fractionation, etc.

OBJECTS AND EMBODIMENTS

A principal object of my invention is to provide an ethylene-containing cracked product effluent, the principal "contaminant" of which is methane. A corollary objective is to provide a process which eliminates any or all of the quenching, cooling, refrigerating, liquid separation, compression, and especially the expensive technique of selective catalytic hydrogenation for reducing the acetylene and butadiene content.

Another object of my invention resides in a process which produces a hydrocracked product effluent rich in ethylene, the principal contaminant of which is methane. In this sense, unreacted propylene is not considered a contaminating influence since it may be recycled to combine with the charge to the hydrocracking reaction zone, and is readily separated from the effluent.

Therefore, in one embodiment, my invention is directed toward an ethylene-producing process which comprises the steps of: (a) dehydrogenating propane at dehydrogenating conditions, in a dehydrogenation zone, and in contact with a non-acidic, Group VIII noble metal dehydrogenating catalyst; (b) hydrocracking at least a portion of the resulting propylene-containing effluent at hydrocracking conditions, in a hydrocracking zone and in contact with a Group VIII metal component hydrocracking catalyst; and, (c) separating the resulting hydrocracked product effluent to separately recover ethylene and unconverted propylene.

A more limited embodiment of my invention involves an ethylene-producing process which comprises the steps of: (a) dehydrogenating propane at dehydrogenating conditions, in a dehydrogenation zone, and in contact with a dehydrogenation composite of alumina, from 0.1% to about 2.0% by weight of an alkalinous metal component, from 0.05% to about 5.0% by weight of a platinum or palladium component and a Group V-A metal component in an atomic ratio to the platinum or palladium component of about 0.20 to about 0.45; (b) hydrocracking at least a portion of the resulting propylene-containing effluent at hydrocracking conditions, in a hydrocracking zone, and in contact with a hydrocracking catalytic composite of an aluminia-silica carrier material and about 0.1% to about 10.0% by weight of a nickel or rhodium component; and (c) separating the resulting hydrocracked product effluent to separately recover ethylene and unconverted propylene.

Other objects and embodiments of my invention relate to additional details regarding preferred catalytic ingredients, the concentration of components in the composite, individual operating conditions for use in the dehydrogenation and hydrocracking zones, preferred processing techniques and similar particulars which are hereinafter given in the following, more detailed summary of my invention. For example, one such embodiment involves separating the dehydrogenation zone effluent to provide (1) a propylene concentrate as the charge to the hydrocracking reaction zone and (2) unreacted propane to be utilized as recycle to the dehydrogenation reaction zone.

SUMMARY OF INVENTION

As hereinbefore set forth, the process of the present invention is intended for the production of ethylene. Essentially, the process is a combination of steps which involve the dehydrogenation of propane to propylene, and hydrocracking the latter to produce ethylene. It is axiomatic that a catalytic composite which could promote the conversion of propane to ethylene must contain a dual-function catalytic reactive metallic component. The dual-function involves both demethylation (or hydrocracking) and dehydrogenation. Investigations indicate that Group VIII metal components, particularly rhodium and nickel possess the propensity to effect demethylation of propane to produce ethylene and methane. Further investigations, however, indicate that these metals, rhodium and nickel, preferentially continue to attack propane, as opposed to demethylation of propylene, whereby methane, rather than ethylene, becomes the dominant product. This is accompanied by an unusual high degree of coke deposition upon the catalytic composite. While it would appear that the obvious solution would be to utilize a catalytic composite having both a dehydrogenation component and a demethylation component, continuous demethylation of propane occurs, and the predominant product is methane, again accompanied by excessive coke laydown.

In accordance with my invention, the conversion of propane to ethylene is accomplished in a combination process involving dehydrogenation followed by hydrocracking of the product olefin. Propane concentrates are available in large quantities from a variety of sources, and are generally recovered as a propane-propylene stream. For example, in a catalytic reforming process for the production of motor fuel, the reformed product effluent is generally stabilized to provide a pentane-plus naphtha product and a normally gaseous butane-minus overhead stream. The latter is generally fractionated in a debutanizer and a depropanizer to recover a butane-butylene concentrate for vapor pressure blending purposes and a propane-propylene concentrate. It is understood that the particular source of the propane charge stock, for use in the dehydrogenation section of the present combination process, is not essential thereto. Similarly, the propane-containing feed stock is not required to be substantially pure; that is, for example, the charge stock may be a 50/50 mixture of propane/propylene. In further describing the present combination process, each section thereof will be individually considered.

PROPANE DEHYDROGENATION

The dehydrogenation of propane, or a mixture of propane and propylene, is effected at dehydrogenation conditions including a maximum catalyst temperature of about 700° F. to about 1300° F., preferably from about 975° F. to about 1150° F., a pressure of from 0 to about 100 p.s.i.g., a hydrogen/propane mol ratio of about 1:1 to about 10:1 and a liquid hourly space velocity of from 1.0 to about 60.0. With respect to the latter, the value is computed as if the propane existed in the liquid state, and is defined as volumes of propane charged per hour per volume of catalyst disposed within the reaction zone. The dehydrogenation catalyst is a composite of a porous carrier material, an alkalinous metal component, a Group V–A metal component and a group VIII noble metal component, the latter preferably selected from platinum and/or palladium. The alkalinous metal component is present in an amount of from 0.1% to about 2.0% by weight, and may be an alkali metal component or an alkaline-earth metal component, including calcium, magnesium and/or strontium, cesium, rubidium, potassium, sodium, and lithium, with lithium and/or potassium being particularly preferred. The Group VIII noble metal, particularly palladium and/or platinum, is present in an amount of from 0.05% to about 5.0% by weight, and the Group V–A metal component, arsenic, antimony and/or bismuth, is present in an amount which results in an atomic ratio to the platinum or palladium component in the range of about 0.20 to about 0.45. In order to avoid the undesirable continuous demethylation reactions, the preferred carrier material is halogen-free alumina. In employing the term "halogen-free," it is intended to allude to alumina particles containing not more than about 0.1% by weight of combined halogen. Additional details of this particularly preferred dehydrogenation catalyst, as well as a suitable method for preparing the same, may be found in U.S. Pat. No. 3,293,319, issued to Vladimir Haensel, et al.

The product effluent from the dehydrogenation reaction zone constitutes the charge to the subsequent hydrocracking reaction zone. The product effluent, primarily unreacted propane, propylene and hydrogen, may be introduced to the hydrocracking reaction zone without intermediate separation. However, in order to further reduce the degree of continuous propane demethylation, a preferred technique involves separation of the dehydrogenation product effluent to provide the propylene-concentrate and a propane-concentrate, the latter being recycled to combine with the feed stock to the dehydrogenation reaction zone.

PROPYLENE HYDROCRACKING

The propylene-concentrate is subjected to hydrocracking in contact with a Group VIII metal component catalyst at hydrocracking conditions including a pressure from 50 to about 1,000 p.s.i.g., a maximum catalyst bed temperature from 400° F. to about 900° F., an LHSV of 1.0 to about 30.0 and a hydrogen/propylene mol ratio of from 1:1 to about 10:1. A preferred hydrocracking catalyst constitutes a composite of an alumina-silica carrier material and about 0.1% to about 10.0% by weight of a nickel or rhodium component. The alumina-silica carrier material, containing from 10.0% to about 90.0% by weight of silica, may be either amorphous or zeolitic in nature.

In accordance with the present invention, the propane-containing charge stock and hydrogen are contacted in a hydrocarbon conversion zone. The contacting may be accomplished by using either catalyst in a fixed-bed system, a moving-bed system, a fluidized-bed system, or in a batch-type operation. In view of the risk of attrition loss of the catalyst, it is preferred to use a fixed-bed system. Furthermore, it is well known that a fixed-bed catalytic process offers many operational advantages, in contrast to a moving-bed or fluidized-bed system, both of which are replete with operational disadvantages. In the fixed-bed type of system, a hydrogen-rich vaporous phase in the feed stock is preheated by any suitable heating means to the desired inlet reaction temperature, the mixture being passed into the conversion zone containing the catalytic composite. The hydrocarbon conversion zone may consist of one or more separate reactors having suitable means therebetween to insure that the desired conversion temperature is maintained at the entrance to one or more catalyst beds. The reactants may be contacted with the catalyst in either upward, downward or radial flow fashion, with a downward/radial flow being preferred. With respect to the propylene hydrocracking reaction zone, an increasing temperature gradient will be experienced as the hydrogen and feed stock traverse the catalyst bed. It is desirable to maintain the maximum catalyst bed temperature below about 900° F., which temperature is virtually identical to that as may be conveniently measured at the outlet of the conversion zone. In order to assure that the hydrocracking catalyst bed temperature does not exceed the maximum allowed for a given process, the use of conventional quench streams, either normally liquid or normally gaseous, and introduced at one or more intermediate loci of the catalyst bed, may be utilized. In view of the fact that the prior art is replete with manufacturing techniques for the preparation of suitable alumina-silica hydrocracking catalysts, and further that the particular method of catalyst preparation is not essential to my invention, further discussion is unnecessary herein.

DESCRIPTION OF A PREFERRED EMBODIMENT

A propane/propylene concentrate is recovered from the by-products of a hydrocracking process designed to produce a $C_4$–380° F. naphtha fraction from a hydro-refined gas oil. The concentrate, about 75.0% propane on a molal basis, is intended for conversion into ethylene for use as a raw material with benzene to form ethylbenzene.

Hydrogen, in an amount to result in a hydrogen/propane mol ratio of 2.0:1.0, is admixed with the concentrate and heated to a temperature of 1065° F. The heated mixture is introduced into a dehydrogenation zone, at a pressure of about 75 p.s.i.g., containing a catalytic composite of alumina, 0.75% by weight of platinum, 0.5% by weight of lithium and arsenic in a mol ratio to platinum of 0.31; the LHSV is about 32.0.

The dehydrogenated product effluent is separated to provide a propane-concentrate for recycle to combine with the fresh feed and a hydrogen-propylene stream to serve as the charge to the hydrocracking zone. The concentrate is heated to a temperature of 650° F., and introduced into the hydrocracking zone at a pressure of about 900 p.s.i.g. The hydrocracking catalyst is a composite of 5.0% rhodium, 63.0% alumina and 37.0% silica, and the LHSV is 25.0.

The hydrocracked product effluent is separated to provide a propylene recycle stream and an ethylene-rich product stream, the principal "contaminant" of which is methane. Analyses of the various streams and the catalytic composite (for coke laydown), and material balances indicate better than 96.0% conversion of propane to ethylene on a mol basis.

The foregoing specification illustrates the method of effecting the combination process of my invention and illustrates the advantages afforded through the use thereof in the production of ethylene.

I claim as my invention:

1. An ethylene-producing process comprising the steps of:
 (a) dehydrogenating propane at dehydrogenating conditions, including a maximum catalyst temperature of about 700° F. to about 1300° F., a pressure of from 0 to about 100 p.s.i.g., in contact with a non-acidic, Group VIII noble metal dehydrogenating catalyst; containing platinum or palladium;
 (b) hydrocracking at least a portion of the resulting propylene-containing effluent at hydrocracking conditions including a pressure from 50 to about 1,000 p.s.i.g., a maximum catalyst bed temperature from 400° F. to about 900° F., in contact with a Group VIII metal component hydrocracking catalyst containing nickel or rhodium; and
 (c) separating the resulting hydrocracked product effluent to separately recover ethylene and unconverted propylene.

2. The process of claim 1 further characterized in that said dehydrogenating catalyst is a composite of a porous carrier material, an alkalinous metal component, a Group V–A metal component and a platinum or palladium component.

3. The process of claim 1 further characterized in that said dehydrogenating conditions include a liquid hourly space velocity of from 1.0 to about 60.0 and a hydrogen/propane mol ratio of 1:1 to about 10:1.

4. The process of claim 1 further characterized in that said hydrocracking conditions include a liquid hourly space velocity of 1.0 to about 30.0 and a hydrogen/propylene mol ratio of from 1:1 to about 10:1.

5. The process of claim 1 further characterized in that said propylene-containing effluent is separated to provide (1) a propylene concentrate as the charge to said hydrocracking step and (2) unreacted propane as recycle to said dehydrogenation step.

6. An ethylene-producing process comprising the steps of:
 (a) dehydrogenating propane at dehydrogenating conditions, including a maximum catalyst temperature of about 700° F. to about 1300° F., a pressure of from 0 to about 100 p.s.i.g., in contact with a dehydrogenation composite of alumina, from 0.1% to about 2.0% by weight of an alkalinous metal component, from 0.05% to about 5.0% by weight of a platinum or palladium component and a Group V–A metal component in an atomic ratio to the platinum or palladium component of about 0.20 to about 0.45;
 (b) hydrocracking at least a portion of the resulting propylene-containing effluent at hydrocracking conditions including a pressure from 50 to about 1,000 p.s.i.g., a maximum catalyst bed temperature from 400° F. to about 900° F. in contact with a hydrocracking catalytic composite of an alumina-silica carrier material and about 0.1% to about 10.0% by weight of a nickel or rhodium component; and
 (c) separating the resulting hydrocracked product effluent to separately recover ethylene and unconverted propylene.

7. The process of claim 6 further characterized in that said alumina-silica carrier material is amorphous.

8. The process of claim 6 further characterized in that said alumina-silica carrier material is a crystalline aluminosilicate.

9. The process of claim 6 further characterized in that said alkalinous metal component is lithium and said Group V–A metal component is arsenic.

References Cited

UNITED STATES PATENTS

| | | | |
|---|---|---|---|
| 2,254,553 | 9/1941 | Thomas | 208—49 |
| 2,307,610 | 1/1943 | Thomas | 208—49 |
| 2,349,160 | 5/1944 | Frey et al. | 208—49 |
| 3,291,855 | 12/1966 | Haensel | 260—683.3 |
| 3,315,007 | 4/1967 | Abell, Jr. | 260—683.3 |
| 3,448,166 | 6/1969 | Bloch | 260—683.3 |
| 3,293,319 | 12/1966 | Haensel | 260—683.3 |
| 3,206,391 | 10/1965 | Gutberl et al. | 208—110 |
| 3,184,404 | 5/1965 | Finn et al. | 208—112 |

DELBERT E. GANTZ, Primary Examiner

J. M. NELSON, Assistant Examiner

U.S. Cl. X.R.

260—683.3